(12) United States Patent
Shute et al.

(10) Patent No.: US 6,328,143 B1
(45) Date of Patent: Dec. 11, 2001

(54) BRAKE SHOE WITH FRICTION MANAGEMENT

(75) Inventors: Bruce W. Shute, West End; Joseph F. Formolo, Laurinburg, both of NC (US); Kelvin Chiddick, Vancouver (CA)

(73) Assignees: Westinghouse Air Brake Technologies Corporation, Wilmerding, PA (US); Kelsen Technologies Corp., North Vancouver (CA)

( * ) Notice: Subject to any disclaimer, the term of this patent is extended or adjusted under 35 U.S.C. 154(b) by 0 days.

(21) Appl. No.: 09/426,456

(22) Filed: Oct. 25, 1999

(51) Int. Cl.[7] ..................................................... F16D 69/00
(52) U.S. Cl. ..................................................... 188/250 R
(58) Field of Search ........................... 188/250 R, 251 R, 188/251 A, 255, 256

(56) References Cited

U.S. PATENT DOCUMENTS

| | | | |
|---|---|---|---|
| 3,959,194 | * | 5/1976 | Adelmann ............................. 260/17.2 |
| 4,173,681 | * | 11/1979 | Durrieu et al. ....................... 428/409 |
| 4,217,255 | * | 8/1980 | Griffith ................................. 260/17.2 |
| 4,219,452 | * | 8/1980 | Littlefield ................................ 260/3 |
| 4,313,869 | * | 2/1982 | Littlefield ............................... 260/38 |
| 4,466,513 | * | 8/1984 | Dedek .................................... 188/243 |
| 5,173,204 | * | 12/1992 | Chiddick et al. ....................... 252/30 |
| 5,308,516 | * | 5/1994 | Chiddick ................................. 252/30 |
| 5,407,031 | * | 4/1995 | Christie .................................... 188/29 |
| 5,595,266 | * | 1/1997 | Cecere ............................. 188/251 A |
| 5,794,740 | * | 8/1998 | Velayutha et al. ............... 188/251 A |
| 5,821,282 | * | 10/1998 | Formolo ................................ 523/149 |
| 6,136,757 | * | 10/2000 | Chiddick ............................... 508/126 |

FOREIGN PATENT DOCUMENTS

6107378-A * 4/1986 (JP) ..................................... 523/149

* cited by examiner

Primary Examiner—Robert J. Oberleitner
Assistant Examiner—Xuan Lan Nguyen
(74) Attorney, Agent, or Firm—Buchanan Ingersoll, P.C.

(57) ABSTRACT

The present invention provides a friction management brake shoe adapted to engage the tread and the flange of a wheel of a railway vehicle via which the railway vehicle is guidably supported on a railed track. The friction management brake shoe comprises a brake lining affixed which has a braking surface engageable with the wheel tread of a wheel of a railway vehicle. The brake lining includes a first friction composition material formed with at least one of a solid high positive friction modifier and a solid very high positive friction modifier which establish a required friction level between the wheel tread and the railed track.

12 Claims, 4 Drawing Sheets

Black Mesa and Lake Powell RR Field Test
HPF Freight Shoes

| Date | % of HPF Shoes | Top of Rail Friction Braking Areas | Non-Braking Areas |
|---|---|---|---|
| 15.Mar.99 | 0% | | |
| 23.Mar.99 | 0% | 0.42 | 0.44 |
| 24.Mar.99 | 25% | | |
| 06.Apr.99 | 25% | 0.41 | 0.59 |
| 07.Apr.99 | 50% | | |
| 26.Apr.99 | 50% | | |
| 27.Apr.99 | 68% | 0.42 | 0.51 |
| 28.Apr.99 | 81% | | |
| 29.Apr.99 | 84% | | |
| 11.May.99 | | 0.43 | 0.54 |
| 12.May.99 | 75% | | |
| 01.Jun.99 | | 0.43 | 0.45 |
| 23.Jun.99 | 90% | 0.36 | 0.35 |
| 21.Jul.99 | 55% | 0.30 | 0.37 |

FIG. 6B

BRAKE SHOE WITH FRICTION MANAGEMENT

CROSS REFERENCE TO RELATED APPLICATIONS

This patent application is closely related to our co-pending patent application titled, "FRICTION MANAGEMENT BRAKE SHOE" filed on Nov. 4, 1998 and assigned Ser. No 09/126,476. The above-referenced application is assigned to the assignee of the present application. The teachings in this co-pending patent application are incorporated herein by reference thereto.

FIELD OF THE INVENTION

The present invention relates, in general, to vehicle type braking equipment and, more particularly, this invention relates to a composition type brake shoe member for use in a railway type vehicle brake system and, even still more specifically, the invention relates to the development of a new type brake shoe and brake shoe friction material that accomplishes both the required braking levels and applies a substantially solid type friction modifier film on the wheel and transfers a portion of that film to the rail creating a substantially optimum friction level between the wheel and rail.

BACKGROUND OF THE INVENTION

Many railroad locomotives and cars use wheel tread braking which provides the braking efforts required by forcing a brake shoe formed with a composition friction material against the tread of the steel wheel. Brake shoe engagement with the wheel tread produces friction that dissipates energy of momentum in the form of heat. In order for such braking to be effective, however, wheel rotation is required. The adhesion due to the friction between the wheel tread and rail tends to maintain such wheel rotation as the brake shoe engages the wheel tread during a braking operation.

Excessive wheel wear and brake shoe change outs have been found to be cyclically high during the winter season. One theory attributes this, at least in part, to the more pronounced cleaning effect that the brake shoe has on the wheel as the result of higher moisture contact during wintertime. In that such cleaning action tends to increase the contact friction; or adhesion between the wheel and rail, increased contact stresses are created in the wheel. Such contact stresses being especially high during the guiding and steering action of the wheel set, particularly, when encountering track curvature.

The combination of braking effort through friction between the brake shoe and wheel tread surface and the adhesion between the wheel and rail translates into thermal and contact stresses of the wheel, which often result in wheel damage. High thermal and contact stresses are known to initiate microcracks in the wheel tread, eventually leading to a defect condition known as shelling.

Another common result of high friction levels between the wheel and the top of the rail is that the wheel tends to rub harder against the rail in the flange area of the wheel and the gage face area of the rail. This has typically been measured as the angle of attack of the wheel to rail and as the lateral force of the wheel against the rail, or as the ratio of the lateral force to the vertical force of the wheel to the rail (L/V ratio). The angle of attack and lateral forces or L/V ratio are prevalent at all times and tend to be higher in cornering cases.

Lowering the top of rail adhesion levels reduces the angle of attack and lateral forces. The effect of reducing these adhesion levels has the benefit of reducing train drag thereby increasing fuel/energy efficiency and reducing wheel tread and flange wear thereby increasing wheel life and reducing gage face rail wear thereby increasing rail life.

Another related problem encountered by some railroads is wheel sliding, which results in wheel tread flat spots. Such flat spots have a deleterious effect on equipment, lading, and passenger comfort due to the high vibration and noise produced by these flat spots. Flat spots due to wheel sliding also lead to wheel defects known as spalling. Repairing such a damaged wheel requires removal of the wheel and subsequent machining of the wheel tread to remove the flat spot or spall defect area.

It has been known to provide a friction modifier material directly to the railway vehicle wheel tread or flange to affect the coefficient of friction therebetween. Examples of such prior art devices can be found in U.S. Pat. Nos. 5,308,516 and 5,173,204, both of which are incorporated by reference herein. Generally, these provide a lubricant composition which can be formed into a solid product, which can be applied directly to the wheel tread or flange, such as by an attachment mechanism which positions the lubricant product immediately adjacent the railway vehicle wheel for periodic applications to the tread and/or flange.

It would be quite advantageous to the railroad industry if a single unit, a brake shoe, in particular, would not only provide the necessary friction between the brake shoe and wheel for satisfactory braking but also provide desirable friction modifiers to optimize the wheel/rail friction interface at the same time.

SUMMARY OF THE INVENTION

The present invention provides a friction management brake shoe adapted to engage the tread of a wheel of a railway vehicle via which the railway vehicle is guidably supported on a railed track. The friction management brake shoe comprises a brake lining affixed to a baking plate, such brake lining has a braking surface engageable with the wheel tread of a wheel of a railway vehicle. The brake lining includes a first friction composition material formed with at least one of a solid high positive friction modifier and a solid very high positive friction modifier which establish an optimum positive friction level between the wheel tread and the railed track.

OBJECTS OF THE INVENTION

It is, therefore, one of the primary objects of the present invention to formulate a compound which provides satisfactory braking while simultaneously transferring a friction modifying material to the wheel.

It is still another object of the present invention to provide a brake shoe which will extend the useful service life of a railroad wheel.

Yet another object of the present invention is to provide a brake shoe which will apply a solid friction modifier film to the wheel and rail.

An additional object of the present invention is to provide a brake shoe which will reduce energy consumption.

Another object of the present invention is to provide a brake shoe which will reduce rail wear.

Still another object of the present invention is to provide a brake shoe which will reduce noise created at the rail/wheel interface by reducing stick slip oscillation.

In addition to the various objects and advantages of the present invention which have been described in some specific detail above, various additional objects and advantages of the present invention will become much more readily apparent to those persons who are particularly skilled in the relevant brake shoe friction art from the following more detailed description of such invention, particularly, when such detailed description is taken in conjuction with the attached drawing Figures and with the appended claims.

Figure 1:
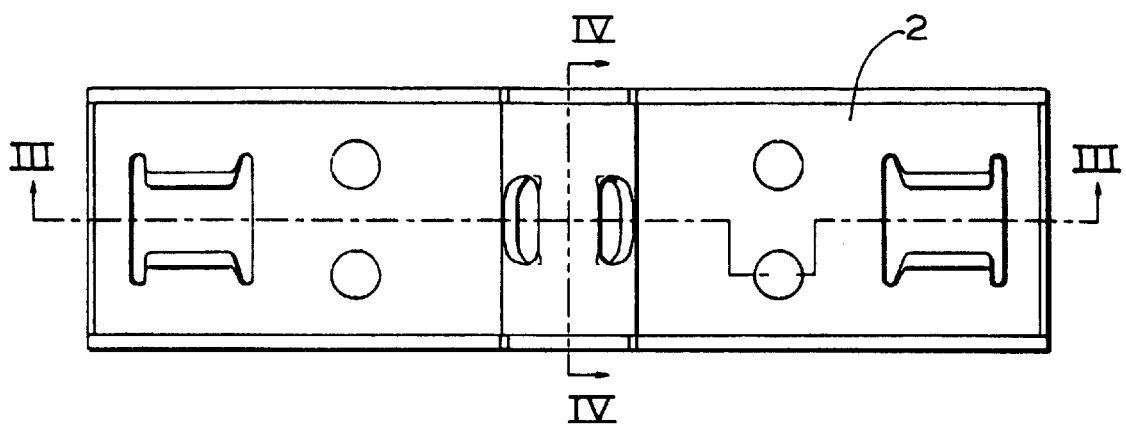
FIG. 1 is a plan view of the back of a friction management brake shoe showing a presently preferred embodiment of a steel backing plate for mounting the brake shoe of the present invention to a railway vehicle.

BRIEF DESCRIPTION OF THE PRESENTLY PREFERRED AND VARIOUS ALTERNATE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Figure 2:
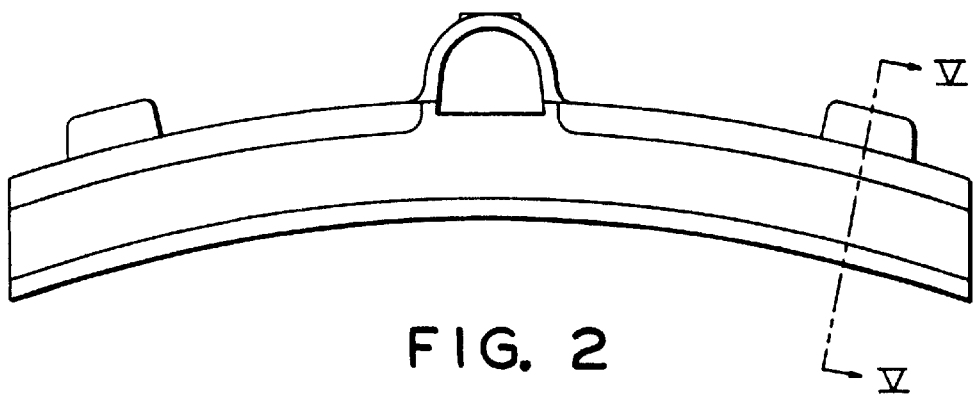
FIG. 2 is a side elevation view of the friction management brake shoe illustrated in FIG. 1.
Figure 3:
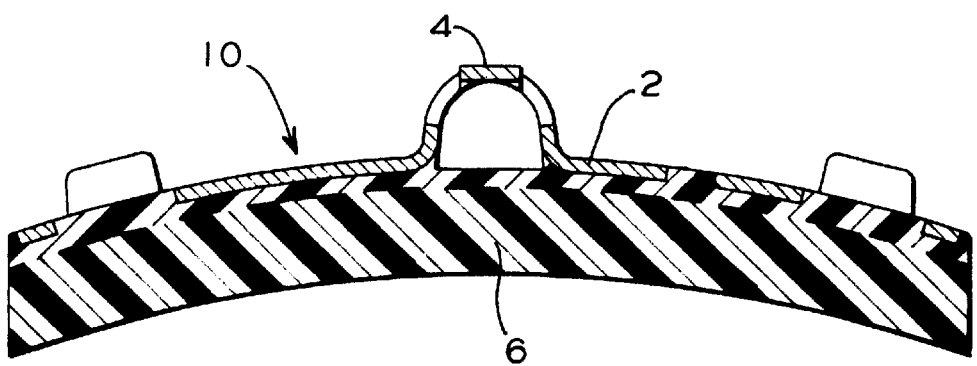
FIG. 3 is a cross-sectional view of the friction management brake shoe taken across the lines III–III in FIG. 1.

Reference is now made, more specially, to FIGS. 1, 2 and 3. Illustrated therein is a brake shoe, which is generally designated 10, comprising a backing plate 2 having a key bridge 4 for affixing the brake shoe 10 to a brake head (not shown) by conventionally known means, such as a brake shoe key (also not shown). Affixed to the backing plate 2 is a presently preferred molded brake block 6.

Before continuing with a discussion of brake block 6, it must be remembered that a fundamental of friction properties is the "coefficient of friction" which is the ratio between the tangential force and the normal force acting between bodies in relative contact. Characteristic friction may be a static friction for surfaces at rest or a dynamic friction for surfaces in motion. When friction increases with increasing percent slip or increasing creep it is characterized by having a positive friction, whereas when it decreases with increasing percent slip or increasing creep it is known as having a negative friction characteristic.

Hereinafter the term "positive friction" means that the coefficient of friction increases with increasing percent slip or increasing creep and a "high" coefficient of friction is greater than 0.20.

Brake block 6 is a molded composition friction material. The composition friction material includes one of a high positive friction (HPF) solid friction modifier or a very high positive friction (VHPF) solid friction modifier. Such friction modifier is incorporated in a specially formulated, homogeneous friction material of the composition brake shoe 6, to establish correct braking characteristics between shoe and wheel and to establish an optimum friction level between the wheel tread and the top of the rail.

Such friction modifier is preferably a powderized mineral and may be selected from the group consisting of calcium carbonate, magnesium carbonate, magnesium silicate (talc), bentonite, coal dust, barium sulphate (barytes), asbestos, aluminum silicate, silica (amorphous, synthetic or natural), slate powder, diatomaceous earth, ground quartz, zinc stearate, aluminum stearate, zinc oxide, iron oxide (peerless grit), antimony oxide, dolomite, lead carbonate, calcium sulphate, graphite molybdenum disulfide and powderdized polyethylene fibers or combinations thereof.

The wheel tread of such railway vehicle is engaged by a brake shoe 6 which includes such HPF solid friction modifier. Railway vehicle as used herein is intended to include passenger and freight locomotives, nonpowered railroad cars as well as certain maintenance of way vehicles.

With railway vehicles having powered axles, such as locomotives for passenger trains, self propelled transit vehicles and railway vehicles having nonpowered axles, which would essentially be all other railway vehicles, such brake shoe 6 with HPF treats the wheel tread with the solid high positive friction modifier to establish a friction level of between about 0.3 and about 0.40 between the wheel tread and the top of the rail.

In a presently preferred embodiment of the invention such friction level is established between about 0.32 and about 0.38. In the case of brake shoes 6 that are presently in use without having such friction modifiers the friction level can very widely and in an uncontrolled manner.

According to the presently preferred embodiment of the present invention, the formulation for a brake shoe having an HPF within the range of between 0.3 and 0.38 is set forth in the following Table 1. As shown therein, the HPF friction management material is comprised of additional friction modifier materials according to the ranges set forth therein. As shown in Table 1, the friction brake shoe of the present invention having a solid high positive friction modifier comprises a first material in the form of a friction composition material for braking a railway vehicle and a second material formed of a predetermined composition material which establishes a predetermined friction level between the wheel tread and the railed track. In a preferred embodiment, the predetermined composition material is comprised between about 5–30% of magnesium silicate (talc) and between about 5–25% of molybdenum disulfide. In a presently most preferred embodiment the solid high positive friction material comprising approximately equal parts, on the order of about 20% each, of these two materials. In utilizing a brake shoe with this HPF formulation, tests were conducted on a dynamometer under various typical operating conditions generally found on an operating train. The results of those tests are summarized in the attached Table 2 and the accompanying graph. As can be seen therein, under standard testing conditions, the friction management brake shoe having the HPF material as described herein, shows friction characteristics between the brake shoe and the wheel tread in the range needed for high friction composition brake shoes. Similar tests conducted according to the AAR Specification M926-92 for high friction composite shoe are also provided in the attached Table 3 and demonstrates braking levels compliant with the specification.

Figure 6A:
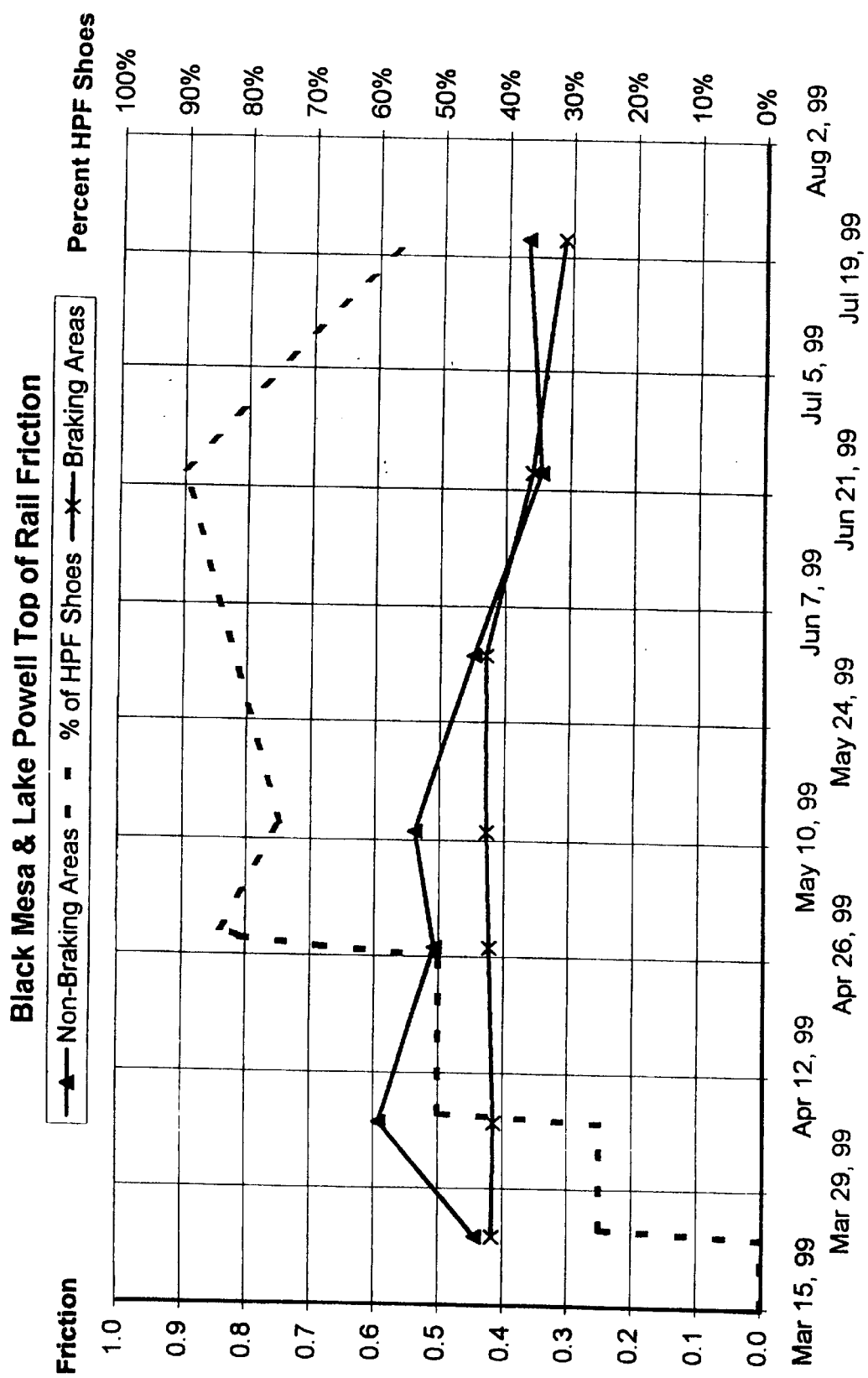
FIG. 6, consisting of FIGS. 6A and 6B graphically show results of testing of a high positive friction brake shoe of the present invention.

Actual testing on a running train was conducted on the Black Mesa and Lake Powell Railroad (Navajo Generating Station). The results for this test are set forth in the graph shown as FIGS. 6A and 6B, and shows the friction level at the top of the rail is controlled in the 0.32–0.38 range after approximately two (2) months running with the HPF brake shoes. In correlating the results of the HPF Friction Management Brake Shoe with past operating conditions of the Black Mesa and Lake Powell Railroad, use of the present invention in the brake shoes was compared according to train energy use, using the parameter of kilowatt hours per ton of coal hauled. The train having the HPF brake shoe of the present inventions was operated as of April, 1999. As shown in Table 4A and the corresponding Graph designated as Table 4B, it can be seen that the use of the Friction Management Brake Shoe of the present invention results in a significant reduction of power usage, an average of 5.7–6.7%. Therefore, the savings to the railroad industry by more efficient friction between the tread and the rail thereby resulting in less energy usage, are significant. In addition, such reduction in energy usage is a positive environmental impact due to decreased emissions.

On powered axles of locomotives for freight trains, higher adhesion is desired to take full advantage of the available tractive effort. Thus, brake shoe 6 includes a very high positive friction (VHPF) solid friction modifier. Such VHPF material treats the wheel tread with such solid friction modifier to establish a friction level of between about 0.40 and about 0.50 between the wheel tread and the top of the rail.

In a presently preferred embodiment of the invention for use on powered axles of such locomotives for freight trains, such friction level is between about 0.42 and about 0.48. Such VHPF friction modifiers are also preferably powderized mineral and may also be selected from the same group of positive friction modifiers discusses supra.

As shown in Table 5, the preferred embodiment of a brake shoe with friction management VHPF formulation comprises components according to the minimum and maximum ranges set forth therein. Although, the friction brake shoe having a solid very high positive friction material include a second predetermined composition material which comprises about 30–80% of the total homogeneous brake shoe composition. Preferably the predetermined composition material comprise about 15–40% barium sulphate (barytes) and about 15–40% cast iron particle. In the most presently preferred embodiment, the very high positive friction modifier is between about 35–36% of barytes and between about 28–29% cast iron particle. As shown in Table 5, the VHPF composition also includes a minimal amount of talc, about 1.38%. This is typical of conventional railway brake shoe material manufactures since it prevents binding of the styrene butadiene rubber after it is shredded to be added to the homogeneous brake shoe configuration. Dynamometer testing was also performed with this formulation, and those results are shown in Table 6 and its corresponding Graph. The braking friction levels achieved are in the range required for high friction composition brake shoes used in locomotive service.

Figure 4:
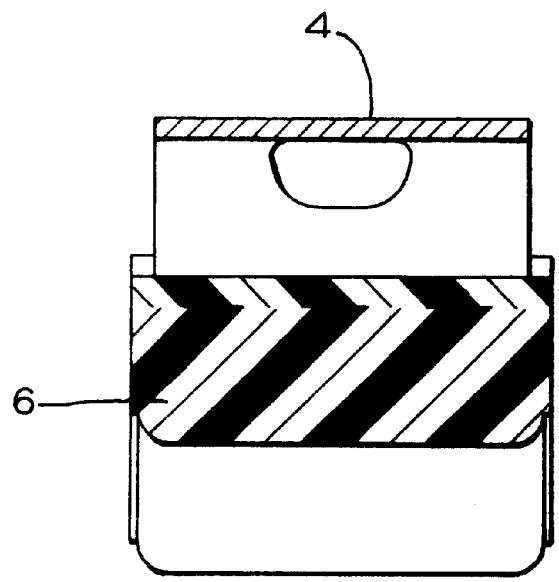
FIG. 4 is a cross-sectional view of the friction management brake shoe taken across the lines IV–IV in FIG. 1.
Figure 5:
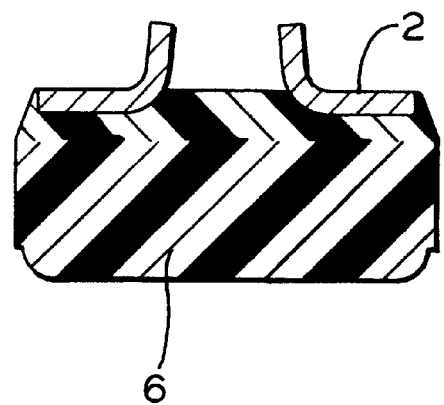
FIG. 5 is a cross-sectional view of the friction management brake shoe taken across the lines V–V in FIG. 2.

Reference is now made, more specifically, to the drawing FIGS. 4 and 5. Illustrated therein is a cross-sectional view of a brake shoe 10 showing the presently preferred brake block 6.

The friction management brake shoe 10 of the present invention provides the recognized benefits of the composition brake shoe as well as the benefits of the wheel to rail friction management in one package. This means that an operating railroad can implement friction management without the addition of any new systems or brackets and continue friction management of their rail system with no additional maintenance activities. In other words, simply continue changing brake shoes when the old shoes are worn out.

The general benefits of friction management are extended wheel life, reduced energy consumption, reduced noise levels and extended rail life. The application of such VHPF solid friction modifier to the wheels on powered locomotive axles provides improved tractive effort and can possibly result in the elimination of on-board sanding systems. The application of such HPF solid friction modifier to all wheels on powered axles of passenger locomotives and on nonpowered axles of other railway vehicles optimizes the friction between the wheel and the top of the rail providing energy savings, decreased wheel and rail wear, reduced wheel slide occurrence, reduced wheel shelling and spalling, reduced lateral forces or L/V ratios and reduced noise levels.

While both the presently preferred and additional alternative embodiments of the present invention have been described in detail above it should be understood that various other adaptations and modifications of the present invention can be envisioned by those persons who are skilled the relevant art of the brake shoes without departing from either the spirit of the invention or the scope of the appended claims.

We claim:

1. A friction management brake shoe adapted to engage a tread of a wheel of a railway vehicle via which such railway vehicle is guidably supported on a railed track, said friction management brake shoe comprising a homogeneous composition of a first friction material for braking a railway vehicle and a second predetermined material which establishes a predetermined friction level between such wheel tread and such railed track, wherein said homogenous composition comprises about 35–37% of said first friction material and about 63–65% of said second predetermined material, said second predetermined material being comprised of a solid very high positive friction material which includes approximately 35–36% by weight of barytes and approximately 28–29% by weight cast iron particle.

2. The friction management brake shoe according to claim 1, wherein said second predetermined material includes one of a solid high positive friction modifier and a solid very high positive friction modifier which establishes the predetermined friction level between such wheel tread and such railed track for stopping such railway vehicle without adversely affecting the coefficient of friction between said brake shoe and said wheel tread.

3. The friction management brake shoe according to claim 1, wherein said second predetermined material comprises a solid high positive friction modifier such that said first friction material comprises about 45–90% of said homogenous composition and second predetermined material comprises about 10–55% of said homogenous composition.

4. The friction management brake shoe according to claim 3, wherein said homogenous composition further comprises between about 5–30% by weight of magnesium silicate and between about 5–25% by weight of molybdenum disulfide.

5. The friction management brake shoe according to claim 1, wherein said homogenous composition comprises about 60–80% of said first friction material and about 20–40% of said second predetermined material.

6. The friction management brake shoe according to claim 5, wherein said second predetermined material is comprised of a solid high positive friction material which includes approximately equal parts of magnesium silicate and molybdenum disulfide.

7. The friction management brake shoe according to claim 5, wherein said predetermined friction level is between about 0.30 and about 0.40.

8. The friction management brake shoe according to claim 7, wherein said predetermined friction level is between about 0.32 and about 0.38.

9. The friction management brake shoe according to claim 1, wherein said second predetermined material comprises solid very high positive friction modifier such that said first friction material comprises about 20–70% of said homogeneous composition and second predetermined material comprises about 30–80% of said homogenous composition.

10. The friction management brake shoe according to claim 9, wherein said homogenous composition further comprises between about 15–40% by weight of barytes and between about 15–40% by weight of cast iron particle.

11. The friction management brake shoe according to claim 1, wherein said predetermined friction level is between about 0.40 and about 0.50.

12. The friction management brake shoe according to claim 11, wherein said predetermined friction level is between about 0.42 and about 0.48.

* * * * *

UNITED STATES PATENT AND TRADEMARK OFFICE
CERTIFICATE OF CORRECTION

| | | |
|---|---|---|
| PATENT NO. | : 6,328,143 B1 | Page 1 of 1 |
| DATED | : December 11, 2001 | |
| INVENTOR(S) | : Bruce W. Shute, Joseph F. Formolo and Kelvin Chiddick | |

It is certified that error appears in the above-identified patent and that said Letters Patent is hereby corrected as shown below:

<u>Title page,</u>
Item [73], Assignees, change "Kelsen" to -- Kelsan --.

Signed and Sealed this

Twenty-fifth Day of June, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,328,143 B1
DATED : December 11, 2001
INVENTOR(S) : Bruce W. Shute, Joseph F. Formolo and Kelvin Chiddick It is certified that error appears in the above-identified patent and that said Letters Patent is hereby corrected as shown below:

Title page,
Item [73], Assignees, change "Kelsen" to -- Kelsan --.

Signed and Sealed this

Fifteenth Day of April, 2003

JAMES E. ROGAN
*Director of the United States Patent and Trademark Office*